United States Patent

[11] 3,583,212

[72] Inventors Cecil A. Nanney
Murray Hill;
Ping K. Tien, Chatham Township; Morris County, both of, N.J.
[21] Appl. No. 778,286
[22] Filed Nov. 22, 1968
[45] Patented June 8, 1971
[73] Assignee Bell Telephone Laboratories, Incorporated
Murray Hill, N.J.

[54] APPARATUS FOR GENERATING AND UTILIZING FREQUENCY-SWEPT PHONONS
8 Claims, 5 Drawing Figs.

[52] U.S. Cl. .................................................. 73/67.2, 330/5.5, 333/30
[51] Int. Cl. .................................................. G01n 29/00
[50] Field of Search .......................................... 73/67.9, 67.2; 333/30; 330/5.5

[56] References Cited
OTHER REFERENCES

Einspruch, N. G. Ultrasonic Studies of Solids. From IEEE Spectrum March 1966. pages 116— 124. Copy in 330/5.(5)

*Primary Examiner*—Jerry W. Myracle
*Attorneys*—R. J. Guenther and Arthur J. Torsiglieri ABSTRACT: There are disclosed a variety of apparatuses for varying the order parameter of a superconductor in order to generate frequency-swept phonons, these phonons being used to investigate the properties of a sample of material capable of coupling the phonons from the superconductor. In respective embodiments the order parameter, and hence the superconductive energy gap, of the superconductor is varied by a pulsed laser beam, a direct-current pulse, and R-F field pulse in a strip line and a magnetic field pulse from an electromagnet. Resonant acoustic absorptions of the sample are observed as the phonon frequency varies.

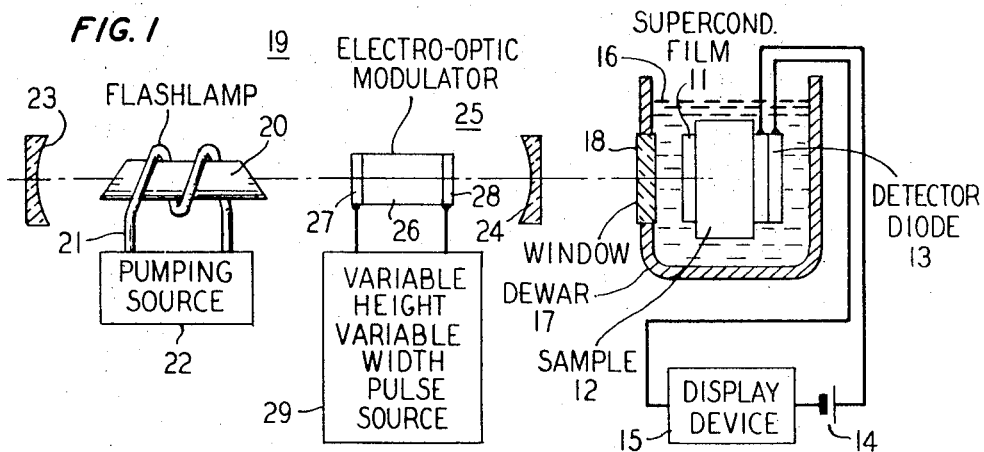
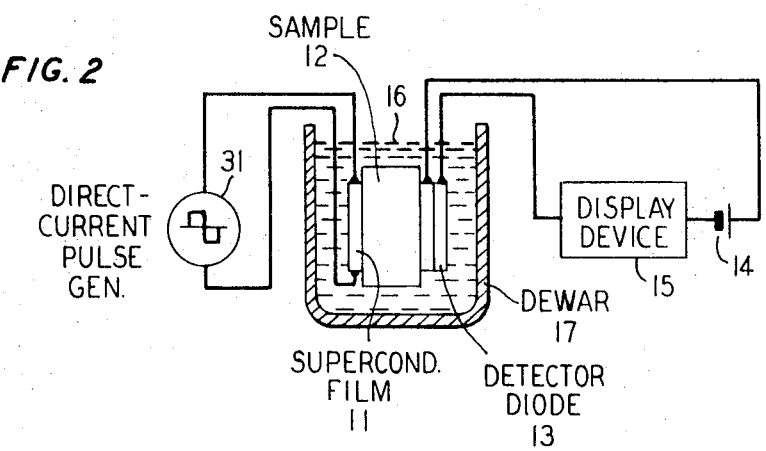
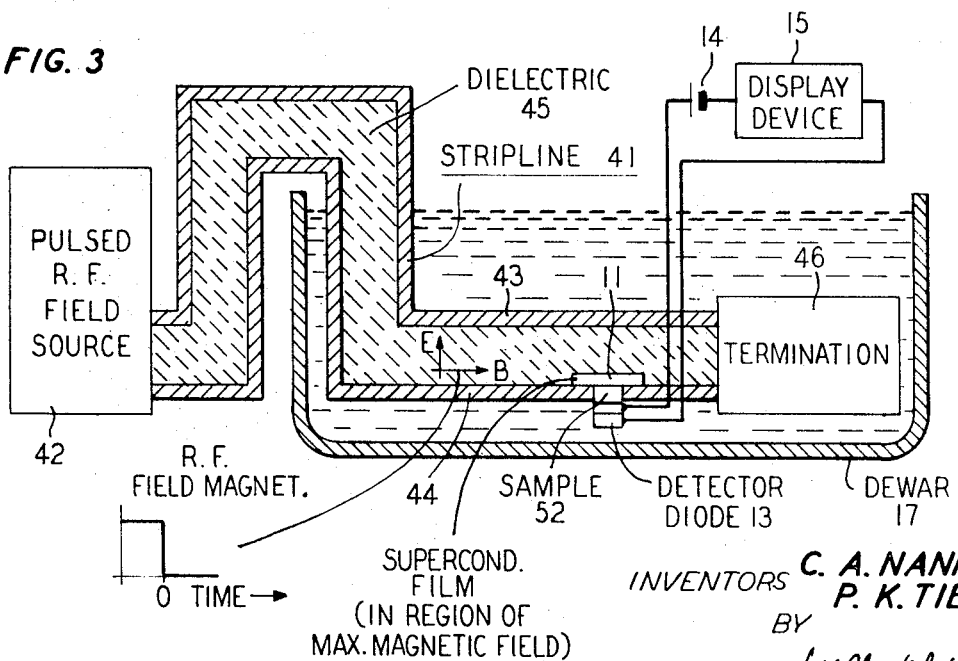

APPARATUS FOR GENERATING AND UTILIZING FREQUENCY-SWEPT PHONONS

BACKGROUND OF THE INVENTION

This invention relates to an apparatus for generating and utilizing frequency-swept phonons. Phonons are packets of acoustic energy. The concept of a packet of acoustic energy, as contrasted to the concept of acoustic waves, is particularly useful for the higher frequencies of acoustic energy. Nevertheless, the terms phonons and acoustic waves can be used nearly interchangeably.

In the copending patent application of A. H. Dayem at al., Ser. No. 586,247, filed Oct. 12, 1966, now U.S. Pat. No. 3,405,374 and assigned to the assignee hereof, there is disclosed the generation of essentially monochromatic streams of phonons by tunneling in superconductive diodes. In their experiments, the tunneling creates so-called quasi-particles in the second layer of the superconductive diode. The quasi-particles first relax to the top of the superconducting energy gap and then emit phonons of frequency corresponding to the energy of the gap by recombination. Since phonons of the very high frequencies thus obtained may be useful for investigating the properties of materials, alternative arrangements for generating the quasi-particles in superconductors under conditions appropriate for obtaining the desired phonons is of continuing interest.

In particular, in the laboratory the experimentalist often needs a frequency-swept phonon generator whose frequency varies in a continuous manner. This need can be appreciated if one considers that many uses have been found in the past for the "chirp" microwave generators found in substantial variety in microwave technology. Thus, in contrast to the apparatus of the above-cited copending patent application, we desire a phonon generator whose frequency is a varying function of time, but which at a given instant emits phonons of a constant frequency.

SUMMARY OF THE INVENTION

According to our invention, this objective is achieved in a single superconducting thin film by applying energy to the film to excite quasi-particles while simultaneously varying the superconducting energy gap of the film. This variation of the superconducting energy gap can be described as a variation of the order parameter of the superconductor. This variation is achieved by appropriately pulsing a direct current in the superconductor or a magnetic field in the superconductor or by heating or cooling the superconductor, preferably without driving it into its so-called normal, or nonsuperconducting, state. Heating of the superconductive film can be achieved illustratively by a pulsed laser beam. The pulse of energy causes the phonons generated to vary in frequency continuously with time, from a first frequency to a second higher frequency during each pulse of excitation.

BRIEF DESCRIPTION OF THE DRAWINGS

Further details and advantages of our invention will become apparent from the following detailed description, taken together with the drawing in which:

FIG. 1 is a partially pictorial and partially block diagrammatic illustration of a first embodiment of our invention;

FIG. 2 is a partially pictorial and partially block diagrammatic illustration of a second embodiment employing a direct-current pulse;

FIG. 3 is a partially pictorial and partially block diagrammatic illustration of a third embodiment of the invention employing a pulsed R-F field;

DESCRIPTION OF ILLUSTRATIVE EMBODIMENTS

Figure 4:
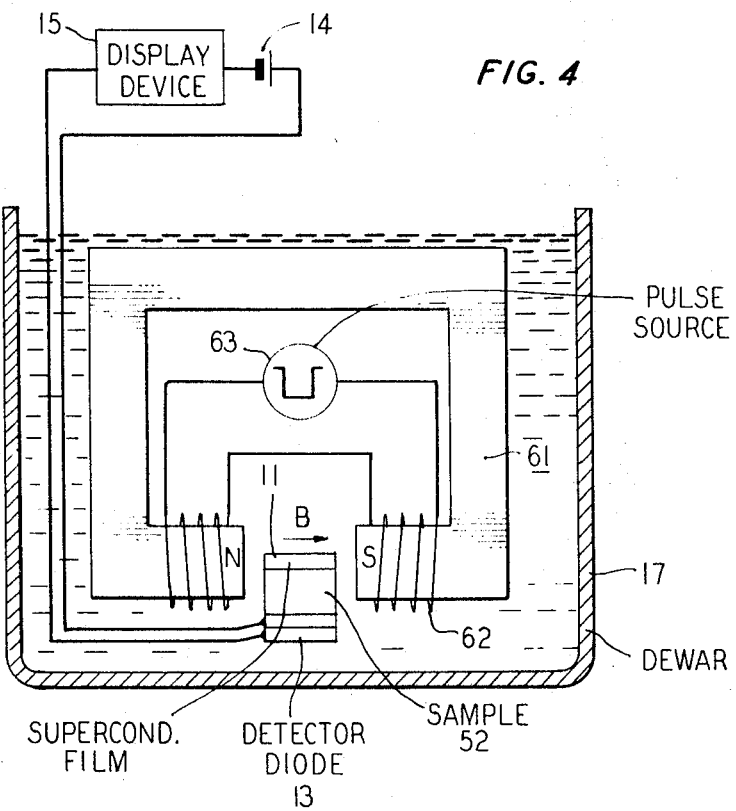
FIG. 4 is a partially schematic and partially block diagrammatic illustration of another embodiment of the invention employing a pulsed direct-current magnetic field.

The phonons generated in the following specific embodiments are of very high frequency lying in the range from $10^{10}$ to $10^{12}$ Hz., where the generation of phonons by conventional techniques is difficult. The cycle of generation may be repeated at frequencies as high as about $10^5$ Hz. Several milliwatts of power may be generated in this manner.

In the embodiment of FIG. 1, a superconducting film 11 in which the phonons are to be generated is disposed on a sample 12 of material, the properties of which are to be investigated. On an opposed surface of sample 12 a superconductive diode 13 is disposed to act as a detector. For this purpose, the detector diode 13 is connected across a bias source 14 and a suitable display device 15 such as a cathode-ray tube. The film 11, sample 12 and detector diode 13 are immersed in liquid helium 16 contained in the cryogenic Dewar 17. At one wall of Dewar 17 there is provided an optically transparent window 18 in order to admit a coherent light pulse from a laser 19.

The laser 19 comprises the solid state active medium 20 with Brewster angle end surfaces, the pumping means including the Flash lamp 21 and pumping source 22 and the optical resonator comprising reflectors 23 and 24 disposed about the active medium 20 and aligned along a common axis. Within the resonator thus formed, an electro-optic modulator 25 is disposed in optical alignment with the active medium 20. It includes the electro-optic medium 26 and the transparent electrodes 27 and 28, through which a modulating voltage is applied from a source 29. Specifically, the modulating voltage is of a magnitude which can rotate the polarization of the coherent radiation by 90° to extinguish the laser oscillation. It is a pulse which should have a width shorter than the period of repetition rate desired of the phonon generator. Thus, the electro-optic modulator 25 acts as a shutter for the coherent light.

Specifically, the film 11 may be a lead superconducting thin film of thickness of 5,000 A., which is less than half of the so-called London penetration depth. The liquid helium provides a temperature of the film 11 of 1.5° Kelvin. The superconducting detector diode 13 is a sandwich of superconducting lead, an insulator such as aluminum oxide and, finally, another layer of superconducting lead. The voltage of source 14 is about 2 millivolts, which is slightly less than one-half of the superconducting energy gap of the lead layers of diode 13. In other words, it is much less than the so-called Fermi energy. The sample 12 may illustratively be a sapphire crystal.

The presence or absence of resonant absorption is to be determined by observation of the display on the cathode-ray display device 15.

The laser 19 may illustratively be a typical ruby laser in which the electro-optic modulator 25 is a potassium dihydrogen phosphate (KDP) electro-optic modulator.

In operation, let us assume that a repetition rate of $10^5$ cycles per second of frequency-swept phonons in the range from $10^{10}$ to $10^{12}$ cycles per second is desired. For an output pulse power of 100 milliwatts as applied to film 11, the width of the pulse can be no greater than about 0.5 microseconds in order not to drive film 11 into its normal state. Thus, the electro-optic modulator 25 must block laser oscillations for the remaining 9.5 microseconds out of the 10 microseconds of each cycle of the repetitive operation. All of the foregoing parameters are merely illustrative of very broad ranges of parameters that would satisfy the principles set out above.

As a result of heating by the laser pulse, the superconducting energy gap of film 11 will be reduced to approximately 0.2 millielectron volts at the end of the laser pulse. Quasi-particles have been excited in film 11 by the laser pulse and will now release and emit phonons by recombination. At the first instant of time during the recombination process, the phonon frequency will be illustratively $2 \times 10^{10}$ Hz. Our analysis, set out hereinafter, shows that the phonon frequency will increase nearly linearly with time as the superconductive film 11 experiences an increase in its order parameter and a corresponding increase in its superconducting energy gap. 5 microseconds later the phonon frequency is now $2\times10^{11}$ Hz. At this time a new laser pulse is applied to the superconducting film 11, and the superconducting energy gap is again reduced. Each laser pulse starts a new cycle of operation.

If it is desired to change the frequency range covered by the frequency-swept phonons, the starting frequency of the phonon generation can be changed by changing the product of pulse height and pulse width from laser 11; and the final frequency of the sweep can be changed by changing the repetition rate of the operation by changing the duration of the time period in which the coherent laser is blocked by electro-optic modulator 25.

As the following calculations will show, the spectrum of the phonon generated can be made uniform over a significantly large range of frequencies. This feature is an important advantage for a variable phonon source.

THE SPECTRUM OF THE PHONON EMISSION

We shall consider first the case in which the phonons are generated by cooling a superconductor from temperature T to a lower temperature T'. In order to calculate this, we must first compute the number of quasi-particles in the superconductors at different temperatures. According to the theory set out in the article by J. Bardeen et al., *Physical Review*, Vol. 108, 1175 (1957), the density of state of a quasi-particle of energy E is:

$$2N(O)\frac{E}{(E^2-\epsilon_0^2(T))^{1/2}} \qquad (1)$$

where $2\epsilon_0(T)$ is the energy gap at the temperature T and $E=(\epsilon^2+\epsilon_0(T))1/2$. The quantity $N(O)$ is the density of states per unit energy interval at the Fermi surface. The factor two comes from two spins for each energy state. Now the quasi-particles are distributed themselves among the energy states according to the Fermi-Dirac distribution, $$\frac{1}{1+e^{E/KT}} \qquad (2)$$

We have, therefore, the number of quasi-particles in the superconductor at the temperature, T, as $$I=4N(O)\int_{\epsilon_0(T)}^{\infty}\frac{E}{(E^2-\epsilon_0^2(T))^{1/2}}\frac{1}{1+e^{E/KT}}dE \qquad (3)$$

Let $X=E/KT$ and $$b=\frac{\epsilon_0(T)}{KT}=\frac{\epsilon_0(T)}{\epsilon_0(O)}\frac{\epsilon_0(O)}{KT_c}\frac{T_c}{T}=1.75\frac{\epsilon_0(T)}{\epsilon_0(O)}\frac{T_c}{T} \qquad (4)$$

Here we have used the relation $2\epsilon_0(0)=3.5 KT_c$, where $2\epsilon_0(0)$ is the energy gap at $0°$ K. The integral I is then reduced to $$I=4(O)KT_c\frac{T}{T}\int^{\infty}\frac{X}{(X^2-b^2)^{1/2}}\frac{1}{1+e^X}dX \qquad (5)$$

Since $b$ and $\epsilon_0(T)/\epsilon_0(O)$ are functions of $T/T_c$ only, we can show that $I/4N(O)KT_c$ is a nearly linear decreasing function of $\epsilon_0(T)/\epsilon_0(O)$ for $\epsilon_0(T)/\epsilon_0(O)$ greater than about 0.5. This function should be *universal* to all the superconductors. It is actually somewhat surprising to discover that between $$\hbar\omega=2\epsilon_0(T), \qquad (6)$$

the function is almost linear. One might expect the function to be exponential; specifically, the worker in the art would expect the number of quasi-particles should decrease exponentially as $\epsilon_0(T)/\epsilon_0(O)$ approaches to unity (or as $KT$ approaches to zero). This is not so because of the nonlinear dependence of $\epsilon_0(T)/\epsilon_0(O)$ with $T/T_c$. As will be seen later, this almost linear relationship between the number of the quasi-particles and $\epsilon_0(T)/\epsilon_0(O)$ has made this "chirp" phonon generator very attractive.

As we cool the superconductor, the energy gap increases as the temperature decreases; and so the number of quasi-particles excited in the superconductor decreases. The lost quasi-particles are removed by recombination and emit phonons whose frequency corresponds to the energy gap of the superconductor, such as, $$\hbar\omega=2\epsilon_0(T), \qquad (6)$$

where $\omega$ is the phonon frequency. Since the energy gap varies with the temperature in the cooling process, we have thus a variable frequency phonon generator. Moreover, we see the phonon frequency is proportional to $\epsilon_0(T)/\epsilon_0(O)$. Considering a specific example, if we cool the superconductor from $T/T_c=0.5$ to 0.9, we find from the figures that the number of the quasi-particles decreases from $0.45\times4\times N(O)KT_c$ to $0.05\times4\times N(O)_c$. Each pair of the quasi-particles lost generates one phonon; we have thus for the number of the phonons generated, $$\frac{1}{2}(0.45-0.05)\times 4 by Pn(O) \; KT_c. \qquad (7)$$

For lead $N(o)=\times10^{34}$/erg-cm.$^3$ and $T_c=7.22°$ K, we have then $\frac{1}{2}\times(0.450.05)\times4\times0.92\times10^{34}\times7.2\times1.38\times10^{116}$ or $7.3\times10^{18}$ phonons/cm.$^3$. Consider a thin film $\frac{1}{2}$ cm. $\times$ $\frac{1}{2}$ cm. $\times$ 1,000 A. and let us repeat the cooling and heating cycle $10^5$ times per second, we generate $1.82\times10^{19}$ phonons per second. Since the curve in FIG. 1a is almost linear in the range considered, the generated phonons are uniformly distributed between the frequency $\hbar\omega=1.05 \epsilon_0(O)$ to $\hbar\omega=1.92 \epsilon_0(O)$. As another example for an aluminum film under the same conditions, $N(O)=1.21\times10^{34}$/erg-cm.$^3$ and $T_c=1.14°$ K, we have $3.8\times10^{18}$ phonons per second.

OTHER EMBODIMENTS

In FIG. 2 the order parameter of the superconducting film 11 is varied by a direct-current pulse from a suitable generator 31, which is connected across the film 11. The remaining components of the apparatus are the same as in FIG. 1 except that window 18 is no longer needed. As in the embodiment of FIG. 1, reduction of the order parameter and the superconducting energy gap occur during the application of the energy, as, simultaneously, quasi-particles are being created in the film 11. The starting frequency of the phonon sweep is again determined by the product of the duration and the power of the energy pulse and the ending frequency of the phonon sweep is again determined by the the precision of the period between the energy pulses. This embodiment provides perhaps the simplest way to vary the order parameter, although the precision obtainable in the control of the frequency-range sweep may be somewhat less than that of the embodiment of FIG. 1. This is so because of inductive effects in the thin film 11 both as the current pulse is started and terminated.

It is also known that the order parameter of a superconductance can be varied by a variable magnetic field. This fact is employed in the modified embodiment of FIG. 3 by disposing the superconducting film 11 in a strip line 41. An R-F field filed is propagated through the strip line 41 from a pulsed R–F source 42. The field from source 42 is propagated with its E field perpendicular to the metallic strips 43 and 44 of strip line 41 and with its magnetic field parallel thereto. The film 11 is disposed in a region where the magnetic field is maximum during the propagation of the pulse. The space between strip conductors 43 and 44 is typically filled by a low-loss dielectric 45 suitable for use at liquid helium temperature.

A small hole is drilled through the magnetic strip 44 to accommodate the sample crystal 52 which is being investigated, and the detector diode 13 is disposed on the opposite surface of sample 52. The R-F field pulse is prevented from being reflected in strip line 41 by an appropriate absorbing termination 46.

In other respects the operation of the apparatus of FIG. 3 is essentially similar to that of the apparatus of FIG. 1.

FIG. 4 shows a modification of the embodiment of FIG. 3, which is structurally more cumbersome because it employs an electromagnet 61. Nevertheless, this embodiment is conceptually nearly identical to that of FIG. 3.

The magnetic field supplied by electromagnet 61 is aligned along the plane of the superconductive film 11 and is pulsed by a pulse of current through the winding 62 from a pulsed current source 63. The electromagnet 61 has its induced north and south poles disposed on opposite sides of film 11 along the desired field direction. The control of the frequency-swept phonons spectron may be achieved by adjustments of the current pulse similar to those used in the embodiment of FIG. 2. In other respects the operation of the embodiment of FIG. 4 is like that of the embodiment of FIG. 3.

Figure 5:
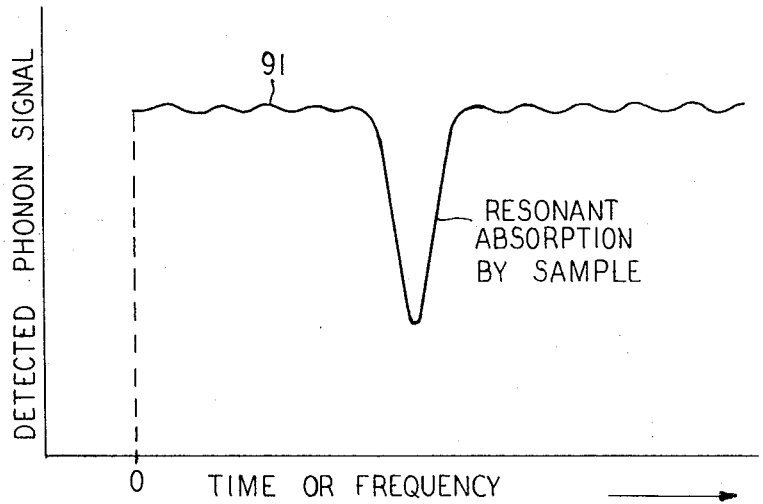
FIG. 5 shows a curve helpful in explaining the use of the invention in investigating the properties of materials.

Curve 91 of FIG. 5 illustrates a typical display that might be seen upon the cathodelike tube-display device 15 of any of the preceding embodiments. The variation of a "chirp" of phonons of rising frequency starts as the energy pulse is turned off at frequency or time $O$. The phonon frequency increases through values indicated on the abscissa of the graph of FIG. 5. The detector signal passed through the superconducting detector diode 13 varies as the absorption of the generated phonons in the sample 12 or 52 varies. It is expected that at a particular frequency of the generated phonons a large absorption, which we term a resonant absorption, may occur in the sample. This is shown by the sharp dip in curve 91. The phonon "chirp" is then illustratively completed without any substantial absorptions occurring at the higher frequency.

It should be apparent that the detector diode 13 in all cases is biased to have an energy gap corresponding to the lowest frequency of the frequency-swept phonon generator, so that all of the phonons may be detected as the frequency of the generator varies. Nevertheless, all of the foregoing embodiments could be modified in the respect that the detector diode energy gap could be swept in synchronism in the superconducting energy gap of the thin film 11. This could be done by varying the order parameter of the superconductive films in diode 13 according to the teaching of any of the embodiments of the present invention, so that the energy gap of the superconductor in the detector diode 13 varies together with energy gap of the film 11, but always remains slightly smaller.

What we claim is:

1. Apparatus of the type intended for use at superconducting temperatures and comprising a superconducting device capable of generation of phonons via recombination of quasi-particles,
   means for exciting said quasi-particles in said device, and
   means comprising material contacting said device for coupling said phonons from said device for utilization, said apparatus being characterized in that
   said device comprises a film of superconducting material and characterized in
   the exciting means comprises an energy superconducting to said film to supply energy capable of simultaneously varying the superconducting energy gap of said film while exciting quasi-particles.

2. Apparatus according to claim 1 in which the energy source is a source of a pulse of light providing a total effect less than required to produce the normal state in the film.

3. Apparatus according to claim 1 in which the energy source is a source of a pulse of direct current providing a total effect less than required to produce the normal state in the film.

4. Apparatus according to claim 1 in which the energy source is a source of a pulse of magnetic field providing a total effect less than required to produce the normal state in the film.

5. Apparatus according to claim 1 in which the coupling means includes a sample of material to be investigated and includes utilization apparatus comprising means for recording the time variation of phonons passed through said sample.

6. Apparatus of the type intended for use at superconducting temperatures and comprising a superconducting device capable of generation of phonons via recombination of quasi-particles,
   means for exciting said quasi-particles in said device, and
   means comprising material contacting said device for coupling said phonons from said device for utilization, said apparatus being characterized in that
   said device comprises a film of superconducting material of thickness less than approximately half of the London penetration depth and
   the exciting means comprises an energy source coupled to said film to supply energy capable of simultaneously varying the superconducting energy gap of said film while exciting quasi-particles, whereby the phonons exhibit a predominant frequency varying in direct relation to said energy gap.

7. Apparatus according to claim 6 in which the device includes a strip line in which the film is disposed and the energy source includes a pulsed microwave energy source coupled to said strip line.

8. Apparatus according to claim 6 in which the energy source is a source of an energy pulse providing a total effect less than that required to produce the normal state in the film.